(12) United States Patent
Gerber et al.

(10) Patent No.: US 6,916,516 B1
(45) Date of Patent: Jul. 12, 2005

(54) PACKING MATERIAL

(75) Inventors: Manfred Gerber, Singen (DE); Jürgen Wendt, Weiterdingen (DE); Otto Hummel, Singen (DE)

(73) Assignee: Alcan Technology & Management Ltd., Neuhausen am Rhenifall (CH)

( * ) Notice: Subject to any disclaimer, the term of this patent is extended or adjusted under 35 U.S.C. 154(b) by 0 days.

(21) Appl. No.: 09/601,245

(22) PCT Filed: Feb. 8, 1999

(86) PCT No.: PCT/CH99/00056

§ 371 (c)(1),
(2), (4) Date: Jul. 31, 2000

(87) PCT Pub. No.: WO99/43570

PCT Pub. Date: Sep. 2, 1999

(30) Foreign Application Priority Data

Feb. 26, 1998 (EP) .............................. 98810155

(51) Int. Cl.[7] .......................... B32B 1/08; B32B 27/00; B32B 15/08; B32B 3/30
(52) U.S. Cl. .................... 428/34.1; 428/35.8; 428/35.9; 428/36.91; 428/195; 428/209; 428/461; 428/916; 206/807
(58) Field of Search .............................. 428/34.1, 35.8, 428/35.9, 36.91, 195, 209, 461, 916; 206/807

(56) References Cited

U.S. PATENT DOCUMENTS

| | | | | |
|---|---|---|---|---|
| 4,629,647 A | * | 12/1986 | Sander ........................ 428/172 |
| 4,725,111 A | * | 2/1988 | Weitzen et al. ................ 359/12 |
| 4,773,718 A | | 9/1988 | Weitzen et al. ................. 359/3 |
| 4,913,858 A | | 4/1990 | Miekka et al. .............. 264/1.34 |
| 5,155,604 A | | 10/1992 | Miekka et al. ................. 359/2 |
| 5,164,227 A | | 11/1992 | Miekka et al. .............. 427/162 |
| 5,200,253 A | | 4/1993 | Yamaguchi et al. ..... 428/195.1 |
| 5,455,129 A | * | 10/1995 | Bussard ......................... 430/1 |
| 5,492,370 A | * | 2/1996 | Chatwin et al. ............ 283/110 |
| 5,643,678 A | * | 7/1997 | Boswell ....................... 428/467 |
| 5,714,231 A | * | 2/1998 | Reinhart ..................... 428/156 |
| 5,743,981 A | * | 4/1998 | Lu .............................. 156/182 |
| 5,810,957 A | * | 9/1998 | Boswell ....................... 156/220 |
| 5,851,615 A | * | 12/1998 | Kay .......................... 428/40.1 |
| 5,977,263 A | * | 11/1999 | Phillips .................... 525/329.9 |
| 5,984,088 A | * | 11/1999 | Dietz et al. ................. 206/205 |
| 6,013,353 A | * | 1/2000 | Touhsaent ................... 428/203 |
| 6,090,471 A | * | 7/2000 | Abrams .................... 428/211.1 |
| 6,164,548 A | * | 12/2000 | Curiel ........................ 235/487 |

FOREIGN PATENT DOCUMENTS

| | | |
|---|---|---|
| DE | 40 25 296 | 2/1991 |
| EP | 0 297 764 | 1/1989 |
| FR | 2 697 808 | 5/1994 |
| WO | WO 89/03760 | 5/1989 |

OTHER PUBLICATIONS

Patent Abstracts of Japan, vol. 96, No. 11, (Nov. 29, 1996).
Patent Abstracts of Japan, vol. 96, No. 2, (Feb. 29, 1996).
Patent Abstracts of Japan, vol. 95, No. 5 (Jun. 30, 1995).
Patent Abstracts of Japan, vol. 18, No. 513 (Sep. 27, 1994).
Patent Abstracts of Japan, vol. 16, No. 311 (Jul. 8, 1992).

* cited by examiner

Primary Examiner—Harold Pyon
Assistant Examiner—Chris Bruenjes
(74) Attorney, Agent, or Firm—Fisher, Christen & Sabol

(57) ABSTRACT

Packaging material, for example, for tube bodies, bearing a hologram-like image. The packaging material is formed for a multilayered material with a layer structure containing: (a) a completely or partially embossed metal foil or metallized plastic film, and (b) on top, at least in specific areas, a transparent single or multilayered plastic layer. The plastic layer (b) forms the outer lying layer of the packaging. The embossed image on the metal foil (a) is visible through the transparent areas of the plastic layer (b). The packaging material gives the observer the impression of viewing a hologram-like image.

8 Claims, 1 Drawing Sheet

PACKING MATERIAL

This is a 371 U.S. national stage application of International (PCT) patent application PCT/CH99/00056, filed on Feb. 8, 1999, that has priority benefit of European Patent Application No. 98810155.6, filed on Feb. 26, 1998.

BACKGROUND OF THE INVENTION

1. Field of the Invention

The invention relates to a packaging material with hologram-like image and the use of the packaging material.

2. Background Art

It is known to provide packaging materials or auxiliary packaging items—such as labels or sealing strips—with holograms as a non-falsifiable means or identifying the product source or as original closure. The production of holograms calls for specially selected materials that are treated in a series of manufacturing steps to yield the desired end product. Forms of packag-ing bearing holograms give consumers the impression that the contents of the packaging are of high quality. There are also many products that do not require an expensive hologram for protection against falsification, but which one would like to be able to make use of the quality-implication of the hologram on more cost favourable forms of packaging.

BROAD DESCRIPTION OF THE INVENTION

The object of the present invention is to propose a packaging material which exhibits a hologram-like image on the whole or parts of the packaging, at least on the side facing outwards.

That objective is achieved by way of the invention in that the packaging material is a multi-layered with a layer structure containing:

a) a completely or partially embossed metal foil or metallised plastic film and, b) on top, at least in specific areas, a transparent single or multi-layered plastic layer where the plastic layer b) forms the outer-lying layer of the packaging and the embossed image on the metal foil or metallised plastic film a) is visible through the transparent areas.

On a finished form of packaging made from the above packaging material the plastic layer b) faces outwards. Further functional layers e.g. of plastic and/or paper may be provided on the free side of the metal foil with, the proviso that holograms in the packaging materials are excluded.

DETAILED DESCRIPTION OF THE INVENTION

The metal foil may e.g. be an iron, steel, copper, gold and in particular an aluminium foil. The foils may have a thickness of e.g. 7 to 100 µm, usefully 7 to 40 µm and advantageously 8 to 40 µm. The aluminium foils may be of pure aluminium of purity e.g. 98.3% and higher, or they may be of an aluminium alloy, for example of the AlFeSi or AlFeSiMn type. If metallised plastic films are employed, the plastic of the films may be e.g. of polyamides, polyesters, polyolefins, polyvinylchloride, polycarbonates etc. The thickness of the plastic films may be e.g. from 7 µm to 100 µm, preferably from 12 µm to 100 µm. On at least one of the surfaces of the plastic film is a metal layer e.g. of iron, nickel, chromium, copper, silver, gold, aluminium etc. of thickness for example of 5 to 500 nm (Nanometre) produced by a metallising process such as a physical or chemical thin layer deposition process in vacuum by sputtering etc.

The metal foil or the metallised plastic film feature an embossed pattern which may cover the whole, some or parts of the surface area. The embossed pattern may be created on the foil by means of embossing rolls. The embossing rolls exhibit the desired embossing pattern and the foil is passed e.g. with a paper coating between the embossing roll and a counter roll. The pattern or image on the embossing roll is thereby transferred to the foil. The embossing may be a series of lines, regular or irregular repeated patterns, damask, worm-like, beaten-type pattern etc. all other kinds of pattern are feasible such as script, figures and abstract patterns, pictures, logos or combinations thereof. It is also possible to colour or print onto the embossed areas and, as desired, also the intervening non-embossed areas. This way it is poss-ible to alter the optical effect of embossing e.g. reinforcing, weakening or alternating accord-ing to the angle of the incident light.

The single layer of plastic film may be a plastic film produced by calendering e.g. hot-calendering. The thickness of the calendered single layer plastic film may be 20 to 200 µm. Plastics that may be employed are thermoplastics such as polyolefin. The plastic layer may a plastic film of at least two layers which has been manufactured by coextrusion. The thickness of each single layer may be 20 to 200 µm. Plastics that may be employed are thermoplastics such as ionomer resins (Surlyn) and polyolefins. The plastic layer may be a thermoplastic deposited as a film on the metal foil by lacquer coating. Useful is a solvent-containing or solvent-free lacquer coating. The lacquer coating may contain or be of a polyolefin. A film of thermoplastic may also be deposited on the metal foil by means of a melt extrudate of a thermoplastic. The melt extrudate may be of or contain a polyolefin. The amounts of lacquer or melt extrudate may be from 3 to 80 g/m$^2$, usefully from 30 to 50 g/m$^2$. The film of thermoplastic may be a monofilm or a two, three or multi-layered film or laminate. The film contains or is comprised of polyolefines. The total thickness of the thermoplastic film is e.g. 20 to 200 µm, usefully 40 to 150 µm, preferably 90 to 120 µm.

The plastic layer is usefully transparent or at least transparent in some areas. The plastic layer may be coloured or clear. The plastic layer may bear printing. In the case of lacquer coating, the film may bear a printed or counterprint image. The printing and any non-transparent areas of the plastic layer are arranged such that at least some areas of the embossed pattern in the metal foil remain visible through the transparent part of the plastic layer.

Preferred thermoplastics are e.g. polyolefines. Examples of polyolefines are polyethylenes e.g. high density polyethylene (HDPE, density greater than 0.944 g/m$^3$), medium density polyethylenes (MDPE, density 0.926–0.940 g/m$^3$), linear medium density polyethylene (LMDPE, density 0.926–0.940 g/m$^3$), linear low density polyethylene (LLDPE, density 0.916–0.925 g/m$^3$) or mixtures thereof. Other polyolefines are polypropylenes such as amorphous, crystalline or highly crystalline polypropylene, atactic or isotactic polypropylene and mixtures of the above mentioned polypropylenes, cast polypropylene, poly-1-butene, poly-3-methylbutene, poly-4-methylpentene and copoylmers thereof such as polyethylene with vinylacetate, vinylalcohol or acrylic acid. Also worthy of mention are copolymers known as ionomer resins of ethylene with about 11% acrylic acid, methacrylic acid, acrylic esters, tetrafluorethylene or propylene. The corresponding statistical copolymers, block polymers or olefin-polymer-elastomer mixtures also belong to the above mentioned polymers. The films are non-stretched and, preferably, axially or biaxially stretched films. The films may be monolayer materials or a two, three or multi-layered laminate.

Useful packaging materials have a layer structure containing:
a) a wholly or partially embossed metal foil, in particular an aluminium foil,
b) a multi-layered plastic layer of
  $b_1$) a lacquer coating or a melt extrudate and
  $b_2$) a film containing a polyolefin.

Packaging materials preferably exhibit a layer structure containing:
a) a wholly or partially embossed metal foil, in particular an aluminium foil,
b) a multi-layered plastic layer of
  $b_1$) a melt extrudate of polyethylene and
  $b_2$) a film containing mainly or comprised of polyethylene.

The free side of the metal foil or the metallised plastic film may bear further functional layers. The choice of the functional layers is determined by the use to which the packaging material will be put. The free side of the metal foil or metallised plastic film may e.g. bear one or more further plastic layers and/or a paper layer or a paper layer and one or more plastic layers and/or further metal foils or metallised plastic films. The plastic layers may be deposited by lacquer coating, calendering or by coextrusion. As a rule papers are applied by lacquer coating or adhesive bonding.

The packaging material according to the invention may e.g. feature plastic films on the free side of the metal foil or metallised plastic film deposited there by lacquer coating or coextrusion. Advantageously, the plastic layers contain thermoplastics such as the above mentioned polyolefines, the polyethylenes and polypropylenes being especially suitable. A lacquer or laminate coating of e.g. 3 to 80 g/m² may be employed. Plastic films may have a thickness of 20 to 150 μm, usefully 20 to 100 μm and preferably 50 to 80 μm.

When in the form of packaging made from the said packaging material, the functional layers on the free side of the metal foil or metallised plastic film face the inside of the packaging i.e. towards the contents of the packaging. For that reason it can be advantageous to provide a barrier layer in the functional layers in order to prevent ingress of fluids, vapours, aromas etc. into the functional layer. The outermost layer, facing out from the packaging, and/or the innermost layer, facing the contents of the packaging, may be a sealable layer. If the layers described are not inherently sealable, then an additional sealing lacquer or sealable film may be employed.

The packaging material may—according to the make up of the layers—be employed for various forms of packaging. For example, the packaging materials mentioned are suitable for manufacturing wrapping films, boxes, bags, pouches, self-standing pouches, sachets, goblets, lidding materials for any kind of base parts such as dishes or menu dishes in the food industry or as push-through and blister packs in the pharmaceutical industry and, preferably, as tubes.

The present invention concerns therefore advantageously also the use of the packaging material for tubes. A particularly suitable packaging material for tubes has the following make up:
$a_1$) a functional layer
a) a wholly or partially embossed metal foil, in particular an aluminium foil or a wholly or partially embossed metallised plastic film
b) a multi-layered plastic film of
  $b_1$) a lacquer coating or a melt extrudate and
  $b_2$) a film containing a polyolefin.

The film $b_2$) may be provided with a printed pattern on one or both sides over part of its surface area.

The functional layer $a_1$) may be a plastic film applied to the metal foil or metallised plastic film by calendering, lacquer coating or by coextrusion.

A packaging material as an example suitable for tube manufacture has the following make up:
$a_1$) a functional layer of a film containing polyolefines, in particular polyethylenes or poly-propylenes and of thickness 20 to 150 μm and
  a lacquer coating or a melt extrudate of a polyethylene, in an amount ranging from 3 to 80 g/m²,
a) a wholly or partially embossed metal foil, in particular an aluminium foil or a wholly or partially embossed metallised plastic film of thickness 7 to 100 μm
b) a multi-layered plastic film of
  $b_1$) a lacquer coating or a melt extrudate of a polyethylene, in an amount of 3 to 80 g/m², and
  $b_2$) a film containing polyolefines. In particular polyethylene or polypropylene and having a thickness of 20 to 200 μm.

This concerns a packaging material which, with respect to the metal foil or metallised plastic film, exhibits by way of example a symmetrical arrangement of layers. The thickness of the individual layers may likewise be chosen such that this is also symmetrical. According to the invention packaging materials may also have an asymmetric structure. In a tube manufactured from the packaging material the polyolefin film represents the functional layer $a_1$) the inner side, and the polyolefin film $b_2$) the outer side of the tube and in particular thereby the tube itself as such. The polyolefines are as a rule sealable. For that reason a tube can be manufactured from the packaging material by providing sealing or adhesive seams. The packaging material in question is especially suitable for manufacturing the pipe shape of a tube. The attachment of the tube head and the closure of the tube end may likewise be performed by sealing or e.g. by adhesive bonding or welding.

A typical packaging material for tubes exhibits the following layered structure:
$a_1$) a functional layer which faces the inside of the tube, made of a polyethylene film of thickness 40 to 80 μm,
  a lacquer coating or a melt extrudate of polyethylene of 30 to 50 g/m²,
a) wholly or partially embossed aluminium foil or a wholly or partially embossed metallised plastic film of thickness 8 to 40 μm,
b) a multi-layered transparent plastic layer of
  b1) a lacquer coating or a melt extrudate of polyethylene of 30 to 50 g/m², and
  b2) a polyethylene film of thickness from 20 to 200 μm, which forms the outside of the tube.

DETAILED DESCRIPTION OF THE DRAWING

Figure 1:
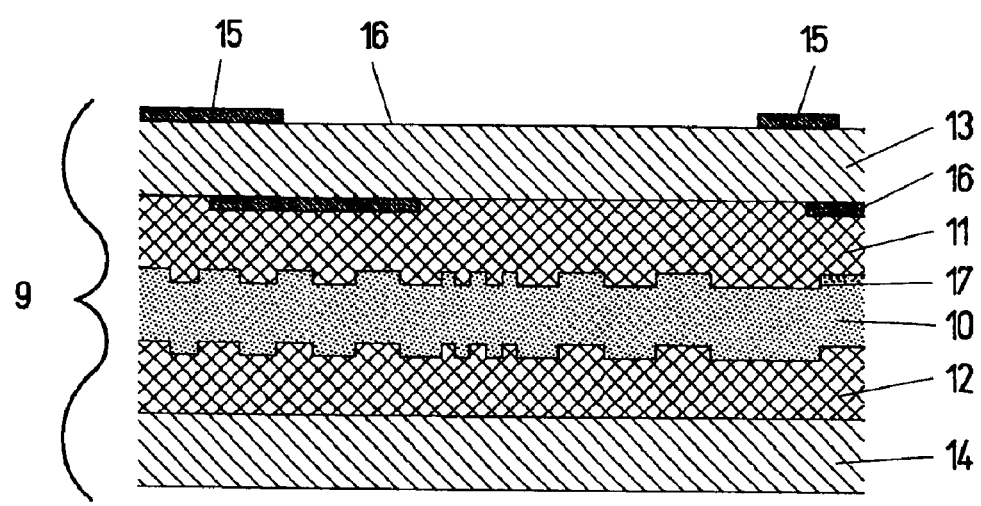
FIG. 1 is a cross-sectionai view of an embodiment of the packaging material according to the invention.

FIG. 1 shows a section through an example of a packaging material 9 according to the invention. The embossed metal foil 10 is coated on the side that later forms the outside of the packaging with a layer 11 of melt extrudate of a low density polyethylene. On top is a film 13 like a three layer film of polyethylene. Possible printing is shown in the form of print 15 on the surface and a counterprint 16. The coating 11 and the film 13 are transparent and the embossing 17 are visible through the plastic layer of melt extrudate 11. On the still free side of the metal foil 10 is a further layer 12 of a melt extrudate and on top of that a further film 14, e.g. a polyethylene film. If a tube or at least the pipe part of a tube is made from the packaging material 9, then the film 14 faces the inside of the tube and hence the contents. The layer 12 and the film 14 may be transparent or opaque. It can be advantageous to provide a barrier layer in or on the film 14, in order to prevent the contents or parts thereof from diffusing into the plastic layer, causing the contents to perish prematurely or delamination of the packaging material. For an observer of a tube made from the packaging material according to the invention the embossed image is visible through the plastic layer, this in addition to any printed image or pattern made up by the printing 15 and counterprint 16. The metallic brightness and the reflection of the metal foil 10, and thereby in particular the reflection influenced by the embossing, lead to optical effects which can be best compared with the visual impressions achieved by holograms. By making use of printing 15 and counterprinting 16 and/or only partially transparent and/or coloured films 13 and/or coloured embossed images 17 in the metal foil 10 a variety of graphic design possibilities can be achieved for the packaging or tube exterior. A packaging material such as that described here may be manufactured by embossing the metal foil 10 using embossing rolls, coating one side with a melt extrudate 11 of the plastic film 11 on one side of the metal foil 10 and, in a further processing step, applying by means of a melt extrudate 12 of the other plastic film 14 to the still free side of the metal foil 10. Of course the coating sequence may be altered or the steps may be carried out simultaneously.

What is claimed is:

1. A tube packaging laminate the tube packaging laminate consisting of a multilayered material having the following order of layers:

layer (A), which is a non-adhesive functional layer of plastic, or at least one functional layer of plastic with the functional layer thereof that forms outer surface of the multilayered material being a non-adhesive functional layer, and arranged on layer (A) is layer (B), which is a metal foil having an embossed design over the whole or part of the surface, and arranged on layer (B) is layer (C), which is a multi-layered plastic layer which is transparent at least in some regions made from layer (D), which is a layer of a lacquer coating or a melt extrudate, and layer (E), which is a non-adhesive film containing at least one polyolefin arranged on the layer (D), and optionally, layer (F), which is at least one printed image or pattern or both between the layer (D) and the layer (E), the at least one printed image or pattern being counterprinted in the layer (D) or the layer (E) or both, and optionally, layer (G), which is at least one printed image or pattern or both on or counterprinted in, or both, surface of the layer (E) away from layer (D), wherein the embossed design is a grid or a regularly or irregularly repeating pattern, wherein the layer (E) forms the outer-lying layer on the tube packaging and the embossed design of the metal foil (B) is visible through the transparent regions of the plastic layer (C), wherein surface of the layer (E) that is positioned away from the metal foil (B), is plane except for any recesses for the optional counterprinted images or patterns or both (G), and wherein surface of layer (D), that is located away from the metal foil (B) is plane except for any recesses for the optional counterprinted printed images or patterns or both (F), the tube packaging laminate has an appearance similar to a hologram.

2. The tube packaging laminate according to claim 1, wherein the pattern of the embossed design is a damask pattern or a small worm design.

3. The tube packaging laminate according to claim 1, wherein the order of layers contains one after another:

layer (A), which is a functional layer made from
    (i) a film containing at least one polyolefin in a thickness of 20 to 150 μm, and
    (ii) a lacquer coating or a melt extrudate of a polyethylene in a quantity of 3 to 80 g/m$^2$, and layer (B), which is a metal foil having a thickness of 7 to 100 μm and having an embossed design over the whole or part of the surface, and layer (C), which is a multi-layered plastic layer made from layer (D), which is a lacquer coating or a melt extrudate of a polyethylene, in a quantity of 3 to 80 g/m$^2$, and layer (E), which is a film containing at least one polyolefin in a thickness of 20 to 200 μm.

4. The tube packaging laminate according to claim 3, wherein the polyolefins of functional layer (A) are polyethylenes and/or polypropylenes.

5. The tube packaging laminate according to claim 3, wherein the metal foil (B) is an aluminum foil.

6. The tube packaging laminate according to claim 3, wherein the polyolefins of the layer (E) are polyethylenes and/or polypropylenes.

7. The tube packaging laminate according to claim 1, wherein the packaging material forms a tube body and the order of the layers contains one after another:

layer (A), which is a functional layer, that on the tube points inwards, made from
    (i) a polyethylene film of a thickness of 40 to 80 μm, and
    (ii) a lacquer coating or a melt extrudate of polyethylene in a quantity of 30 to 50 g/m$^2$, and layer (B), which is an aluminum foil having a thickness of 8 to 40 μm and having an embossed design over the whole or part of the surface, and layer (C), which is a multi-layered transparent plastic layer made from layer (D), which is a lacquer coating in a melt extrudate of polyethylene in a quantity of 30 to 50 g/m$^2$, and layer (E), which is a polyethylene film of a thickness of 20 to 200 μm, which forms the outer side on the tube.

8. The tube packaging laminate according to claim 1, wherein the layer (E) optionally has a printing pattern on one or both sides.

* * * * *